United States Patent
Niwano

(10) Patent No.: US 10,467,991 B2
(45) Date of Patent: Nov. 5, 2019

(54) MEASUREMENT INSTRUMENT AND REFLECTION DEVICE USED FOR SAME

(71) Applicant: MITUTOYO CORPORATION, Kawasaki, Kanagawa (JP)

(72) Inventor: Atsuya Niwano, Tokyo (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 15/858,518

(22) Filed: Dec. 29, 2017

(65) Prior Publication Data

US 2018/0211637 A1 Jul. 26, 2018

(30) Foreign Application Priority Data

Jan. 26, 2017 (JP) .................. 2017-012483

(51) Int. Cl.
| | | |
|---|---|---|
| G09G 5/38 | (2006.01) | |
| G02B 7/182 | (2006.01) | |
| G06F 3/147 | (2006.01) | |
| G02B 5/08 | (2006.01) | |
| G02B 27/04 | (2006.01) | |

(52) U.S. Cl.
CPC ............ G09G 5/38 (2013.01); G02B 7/1821 (2013.01); G06F 3/147 (2013.01); *G02B 5/08* (2013.01); *G02B 7/182* (2013.01); *G02B 27/04* (2013.01); *G09G 2340/0492* (2013.01); *G09G 2380/10* (2013.01)

(58) Field of Classification Search
CPC ......................................................... G06F 1/13
See application file for complete search history.

(56) References Cited

U.S. PATENT DOCUMENTS 5,014,046 A * 5/1991 Minami ................ G08B 5/225
340/7.55

FOREIGN PATENT DOCUMENTS

JP 2008-111706 A 5/2008

* cited by examiner

*Primary Examiner* — Jeffrey J Chow
(74) *Attorney, Agent, or Firm* — Oliff PLC

(57) ABSTRACT

A measurement instrument includes a display configured to display information; a display controller configured to control displaying of the information on the display; and a reflector configured to invert the information displayed on the display via specular reflection. Since the measurement instrument includes the reflector configured to invert the information displayed on the display via specular reflection, information can be seen via the reflector even when the information is difficult to read directly from the display. Thus, the measurement instrument can improve visibility of the information displayed on the display.

18 Claims, 12 Drawing Sheets

NORMAL DISPLAY

INVERTED DISPLAY

NORMAL DISPLAY

LEFT/RIGHT INVERTED DISPLAY

MEASUREMENT INSTRUMENT AND REFLECTION DEVICE USED FOR SAME

BACKGROUND

The present disclosure relates to a measurement instrument including a display unit configured to display information, and relates to a reflection device used for the same.

In the related art, there is known a measurement instrument including a display unit configured to display information and a display control unit configured to control displaying the information on the display unit.

As such a measurement instrument, there is a digital display measurement instrument described in JP 2008-111706 A. This measurement instrument includes a liquid crystal portion (display unit) with a monochrome digital display, and an operation button that when operated switches the display to rotate the numbers (information) displayed on the liquid crystal portion 180°.

This digital display measurement instrument can rotate the numbers displayed on the liquid crystal portion 180° via the operation button and display the numbers even when a user uses the digital display measurement instrument in an upside-down manner with the liquid crystal portion being rotated 180°. As a result, the user can correctly read the numbers displayed on the liquid crystal portion without changing the angle of view.

SUMMARY

However, depending on the angle at which the user looks at the display surface of the display unit, light from outside such as from a fluorescent lamp can show on the display surface, and it can be difficult for the user to see information displayed on the display unit via the display surface.

An object of the disclosed embodiments is to provide a measurement instrument and a reflection device used for the same that can improve visibility of information displayed on a display unit.

A measurement instrument according to an embodiment includes:

a display configured to display information;

a display controller configured to control displaying of the information on the display; and a reflector configured to invert the information displayed on the display via specular reflection.

According to such an embodiment, since the measurement instrument includes the reflector configured to invert the information displayed on the display via specular reflection, the user can see (read) the information via the reflector even when the information is difficult to read directly from the display (i.e., due to the position of the user relative to the measurement instrument). Thus, the measurement instrument can improve visibility of information displayed on the display.

Additionally, the measurement instrument can suppress the amount of outside light reaching the display surface of the display by blocking the outside light with the reflector. This may prevent the information displayed on the display via the display surface from being difficult for a user to see. Thus, the measurement instrument can improve visibility of information displayed on the display.

In such an embodiment, the display controller is preferably configured to control displaying on the display of an inverted display image formed by inverting a normal display image of the information.

Here, the information that a user sees via the reflector is inverted via specular reflection. Thus, a user may not be able to see (read) the information displayed in an ordinary state.

However, according to such a configuration, the display controller is configured to control displaying on the display of an inverted display image formed by inverting a normal display image (an ordinary state of display) of the information. This enables a user to see the information in an ordinary state via the reflector. Thus, a user can see (read) information in an ordinary state via the reflector.

The display controller is preferably configured to control displaying of an inverted display image formed by inverting a normal display image of the information on the display in line symmetry with respect to an axis of symmetry that is an intersection line of a display surface of the display and a reflection surface of the reflector, and the axis of symmetry extends in a lateral direction of the normal display image of the information at a location outside of a display region of the information and is disposed at a position other than on a lower side of the display region of the information.

Here, the "display region of the information" is the region in which the information can be displayed by the display. Then, the information seen by the user via the reflector is inverted in line symmetry via specular reflection with respect to an axis of symmetry that is the intersection line of the display surface of the display and the reflection surface of the reflector, when the intersection line extends in the lateral direction of the normal display image of the information at a location outside of the display region of the information and is disposed on any of the upper side, the right side, and the left side of the display region of the information.

Thus, a user may not be able to see the information displayed in an ordinary state.

However, according to such a configuration, the display controller is configured to control displaying on the display of an inverted display image formed by inverting a normal display image of information in line symmetry with respect to the axis of symmetry. This enables a user to see (read) the information in an ordinary state via the reflector.

The display controller is preferably configured to control displaying on the display of a left/right inverted display image formed by left/right inverting a normal display image of the information with respect to an axis of symmetry that is an intersection line of a display surface of the display and a reflection surface of the reflector, and the axis of symmetry extends in a vertical direction or in a lateral direction of the normal display image of the information at a location outside of a display region of the information and is disposed at a position on a lower side of the display region of the information.

Here, the information seen by the user via the reflector is left/right inverted via specular reflection with respect to an axis of symmetry that is the intersection line of the display surface of the display and the reflection surface of the reflector, when the intersection line extends in the vertical direction or in the lateral direction of the normal display image of the information at a location outside of the display region of the information and is disposed on the lower side of the display region of the information. Thus, a user may not be able to see the information displayed in an ordinary state.

However, according to such a configuration, the display controller is configured to control displaying on the display of a left/right inverted display image formed by left/right inverting a normal display image of information with respect to the axis of symmetry. This enables a user to see (read) the information in an ordinary state via the reflector.

In such an embodiment, the display controller preferably is configured to switch between displaying the inverted display image and the normal display image on the display.

According to such a configuration, since the display controller is configured to switch between displaying an inverted display image and a normal display image, it is possible to switch between an inverted display image and a normal display image of information displayed on the display. In other words, when a user directly sees the information displayed on the display, the measurement instrument can switch to a normal display image, and when a user indirectly sees the display via the reflector, the measurement instrument can switch to an inverted display image. Accordingly, a user can select a normal display image and an inverted display image, depending on how the user sees (views) the display.

The reflector preferably is pivotally attached to the display so that an angle between a display surface of the display and a reflection surface of the reflector is adjustable; the measurement instrument further comprises an angle detector configured to detect the angle between the display surface and the reflection surface, and the display controller is configured to switch to the inverted display image or to the normal display image based on the angle detected by the angle detector.

Here, the angle between the display surface of the display and the reflection surface of the reflector is referred to as the angle of the reflector.

According to such a configuration, since the reflector is pivotally attached to the display so that the angle of the reflector is adjustable, the angle of the reflector can be controlled freely. Thus, a user can control the angle of the reflector to make the information easier to see.

Additionally, the angle detector detects the angle of the reflector, and the display controller is configured to switch to the inverted display image or to the normal display image based on the detected angle detected by the angle detector. As a result, the information displayed on the display can automatically be switched depending on the angle of the reflector. Thus, the information displayed on the display automatically switches depending on the angle of the reflector controlled by the user. As a result, the usefulness of the measurement instrument can be improved.

In such an embodiment, preferably, the reflector and a housing of the measurement instrument include cooperating connectors by which the reflector is detachably attached to the housing of the measurement instrument.

According to such a configuration, the reflector can be detachably attached to the measurement instrument. Thus, the user can select whether to attach the reflector to the measurement instrument.

A reflector according to an embodiment is used for a measurement instrument that includes a display configured to display information, and a display controller configured to control displaying of the information on the display, and the reflector is configured to invert the information by specularly reflecting the information displayed on the display.

According to such an embodiment, since the reflector reverses the information displayed on the display via specular reflection, a user can see the information via the reflector when the information is difficult for the user to read directly from the display. Thus, the reflector can improve visibility of the information displayed on the display.

Additionally, while light from outside can be blocked by the reflector, the reflector can suppress the amount of light from outside reaching the display surface of the display. This may prevent the information displayed on the display via the display surface from being difficult for a user to see. Thus, the reflector can improve visibility of the information displayed on the display.

DETAILED DESCRIPTION

First Embodiment

A first embodiment will be described below with reference to the drawings.

Figure 1A:
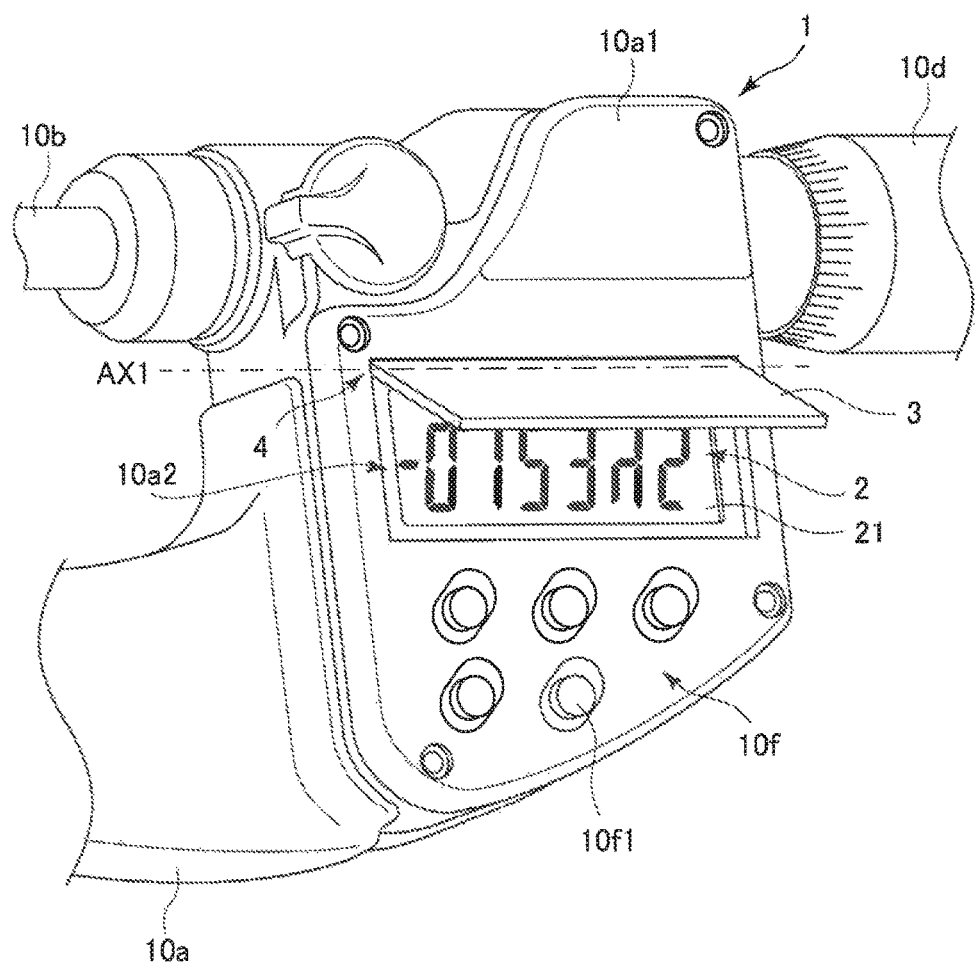
FIGS. 1A and 1B are perspective views illustrating a measurement instrument and a reflection device used for the measurement instrument according to a first embodiment.
Figure 1B:
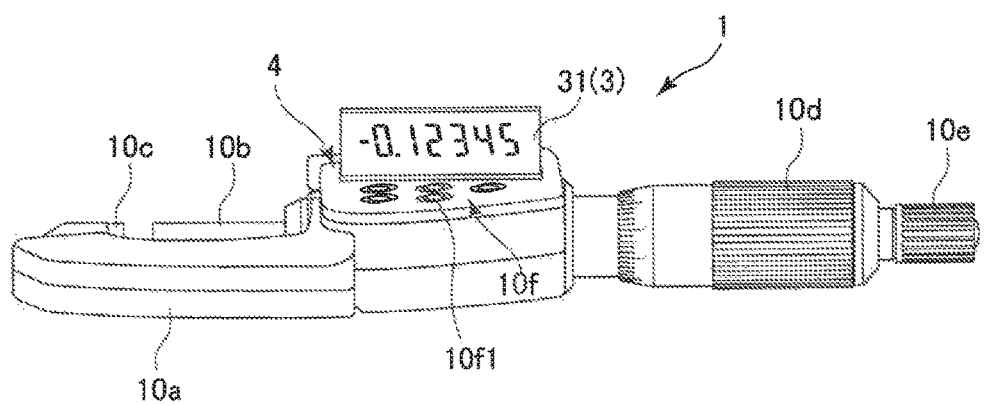

FIGS. 1A and 1B are perspective views illustrating a measurement instrument and a reflection device used for the measurement instrument according to the first embodiment.

As illustrated in FIG. 1A, the measurement instrument 1 is a micrometer including a display unit 2 configured to display information, a reflection device 3 configured to invert via specular reflection and display the information displayed on the display unit 2, and an angle control mechanism 4 configured to control the angle between a display surface of the display unit 2 and a reflection surface of the reflection device 3.

Note that hereinafter, the angle between the display surface of the display unit 2 and the reflection surface of the reflection device 3 may be referred to the angle of the reflection device 3.

As illustrated in FIG. 1B, the measurement instrument 1 includes a substantially U-shaped measurement instrument body 10a, a cylindrical spindle 10b, an anvil 10c formed on the measurement instrument body 10a, a thimble 10d and a ratchet stop 10e configured to advance and retract the spindle 10b toward/away from the anvil 10c when rotated, and a plurality of button-type operation portions 10f configured to receive operations from a user to operate the measurement instrument 1.

The measurement instrument body 10a includes a cover portion 10a1 that is fixed to the measurement instrument body 10a by a screw to cover the display unit 2 and the operation portions 10f. The cover portion 10a1 includes substantially centrally located rectangular-shaped window portion 10a2 and is formed such that the display unit 2 is exposed. Note that the window portion 10a2 may have any other shape than a rectangular shape. In other words, the window portion 10a2 may have any shape that enables a user to see the information displayed on the display unit 2.

The operation portions 10f are disposed at a position on the measurement instrument body 10a that is on the opposite side of the display unit 2 to the spindle 10b and the thimble 10d, and include a button-type switch operation portion 10f1 configured to switch the display of the display unit 2. The switch operation portion 10f1 will be described in detail below.

Note that the operation portions 10f including the switch operation portion 10f1 may be of sliding-types or have any configuration that enables a user to operate. Additionally, the operation portions 10f may be disposed at any position that enables a user to operate.

The measurement instrument 1 is configured such that rotating the thimble 10d or the ratchet stop 10e moves the spindle 10b in the axial direction toward or away from the anvil 10c. The measurement instrument 1 is configured to measure the length of a measurement subject disposed between the spindle 10b and the anvil 10c from the rotation angle displacement from rotating the thimble 10d or the ratchet stop 10e. The display unit 2 is configured to display, for example, the results of the measurement of the measurement subject by the measurement instrument 1 as information.

The display unit 2 includes a display surface 21 composed of a liquid crystal panel provided so as to be exposed from the cover portion 10a1 of the measurement instrument body 10a, and is configured to display information as mainly a seven-segment digital display image in a display region of the display unit 2.

Note that the display surface 21 is not limited to the display surface composed of a liquid crystal panel, and may be an organic electroluminescent display or an electronic paper display. In other words, the display surface 21 may be any type of display surface on which the information relating to the measurement instrument 1 can be displayed.

The reflection device 3 is formed as a rectangular plate-like member with substantially the same shape as the shape of the display surface 21 of the display unit 2, and includes a reflection surface 31 provided on a surface facing the display unit 2. The reflection surface 31 is composed of a mirror and is configured to entirely reflect the information displayed on the display unit 2. Additionally, the reflection surface 31 is configured to invert the information displayed on the display unit 2 via specular reflection. Note that the reflection device 3 may be formed as any other member with any other shape than a rectangular plate-like member. In other words, the reflection device 3 may be formed as any member that can specularly reflect the information displayed on the display unit 2.

Figure 2:
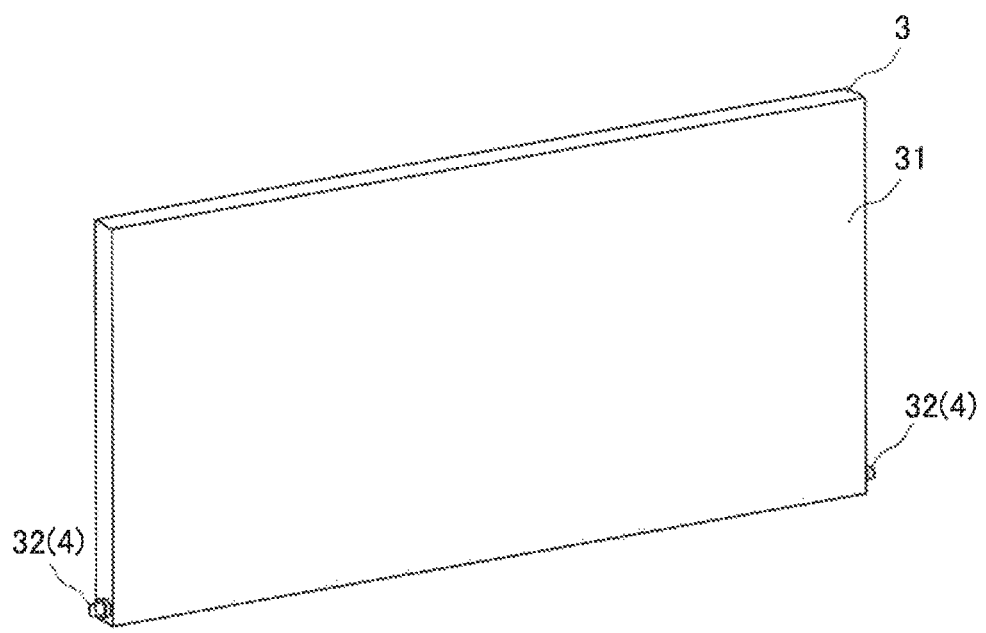
FIG. 2 is a perspective view illustrating the reflection device according to the first embodiment.

FIG. 2 is a perspective view illustrating the reflection device according to the first embodiment.

As illustrated in FIG. 2, the reflection device 3 includes a pair of attachment portions 32 configured to attach the reflection device 3 to the measurement instrument 1.

The attachment portions 32 are provided projecting in the longitudinal direction from both sides in the longitudinal direction of the reflection device 3 on the side to one end (lower side of the paper). Additionally, the attachment portions 32 are each formed in a cylindrical shape and each function as a rotation shaft about which the reflection device 3 rotates when the reflection device 3 is attached to the measurement instrument 1.

Figure 3:
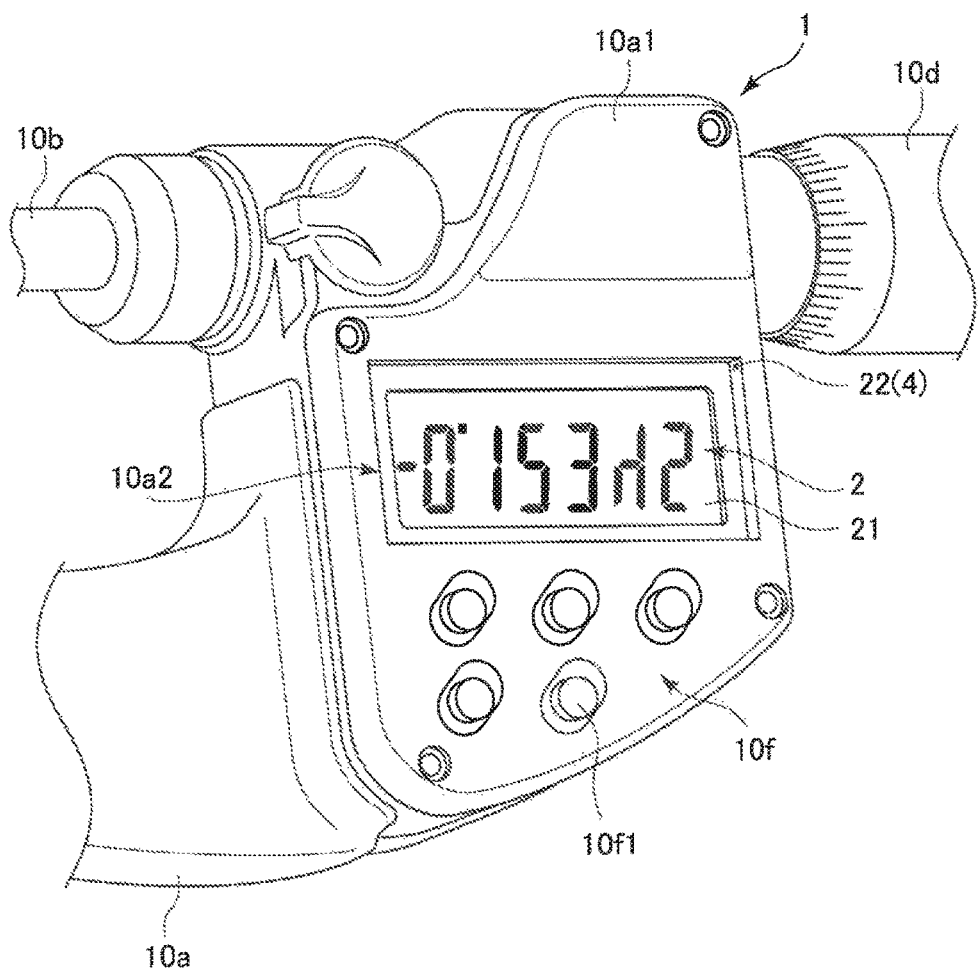
FIG. 3 is a perspective view illustrating the measurement instrument with the reflection device removed, according to the first embodiment.

FIG. 3 is a perspective view illustrating the measurement instrument with the reflection device removed, according to the first embodiment. As illustrated in FIG. 3, the window portion 10a2 of the cover portion 10a1 includes a pair of installation portions 22 for attaching the reflection device 3 to the measurement instrument 1.

The installation portions 22 are formed as holes with circular cross sections recessed in the longitudinal direction from both inner sides in the longitudinal direction of the window portion 10a2 to one end (upper side of the paper). The installation portions 22 are slightly larger than the attachment portions 32 (see FIG. 2). Accordingly, the reflection device 3 can be attached to the measurement instrument 1 by pushing the attachment portions 32 into the installation portions 22.

Here, as illustrated in FIGS. 1A and 1B, when the reflection device 3 is attached to the measurement instrument 1 and the attachment portions 32 engage with the installation portions 22, the installation portions 22 and the attachment portions 32 function as rotation shafts about which the reflection device 3 rotates. Thus, the installation portions 22 and the attachment portions 32 function as an angle control mechanism 4.

The angle control mechanism 4 is configured to control the angle of the reflection device 3 when a user rotates the reflection device 3 with the attachment portions 32 functioning as rotation shafts.

Note that the attachment portions 32 may each have a projecting hemispherical shape, rather than a projecting cylindrical shape, and the installation portions 22 may also be formed as holes that are each recessed in a hemispherical shape. In other words, the angle control mechanism 4 may be any mechanism that can control the angle of the reflection device 3.

Figure 4A:
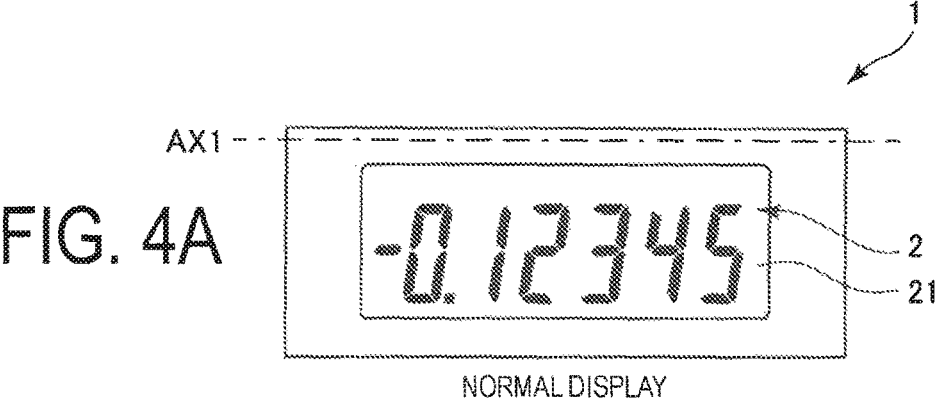
FIGS. 4A and 4B are views illustrating a display unit according to the first embodiment.
Figure 4B:
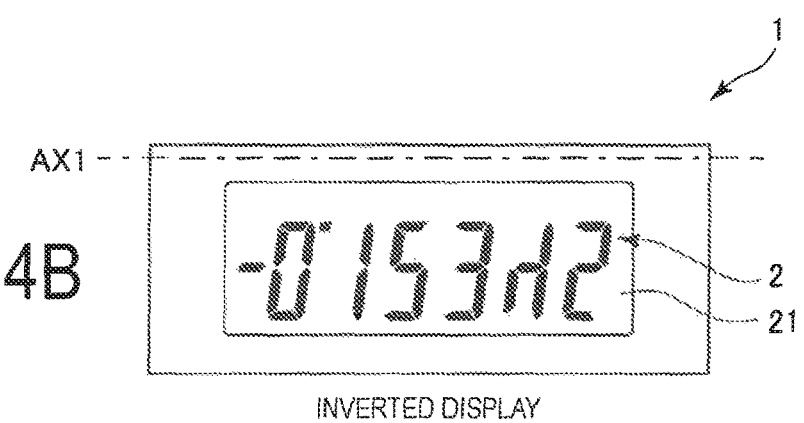

FIGS. 4A and 4B are views illustrating the display unit according to the first embodiment.

Specifically, FIG. 4A illustrates a normal display (image) displayed on the display unit 2, and FIG. 4B illustrates an inverted display (image) displayed on the display unit 2.

As illustrated in FIG. 4A, the normal display (image) displayed on the display unit 2 is a state in which a user can see (read) information in an ordinary state.

As illustrated in FIG. 4B, the inverted display (image) displayed on the display unit 2 is a display formed by inverting the information in line symmetry with respect to an axis of symmetry AX1 that is an intersection line of the display surface 21 of the display unit 2 and the reflection surface 31 of the reflection device 3, and the axis of symmetry AX1 extends in the horizontal direction or lateral direction of the normal display of the information and is located outside of the display region of the information, and is disposed on the upper side that is a position other than on the lower side of the display region of the information.

Note that the axis of symmetry AX1 is coaxial with the rotation axis of the angle control mechanism 4 about which the reflection device 3 rotates, and hereinafter, the rotation axis of the angle control mechanism 4 may also be referred to as the axis of symmetry AX1.

Here, the information that a user sees via the reflection device 3 is inverted in line symmetry via specular reflection with respect to the axis of symmetry AX1. Thus, since a user looks at the inverted display via the reflection device 3, the user can see (read) the information in the ordinary state.

Figure 5:
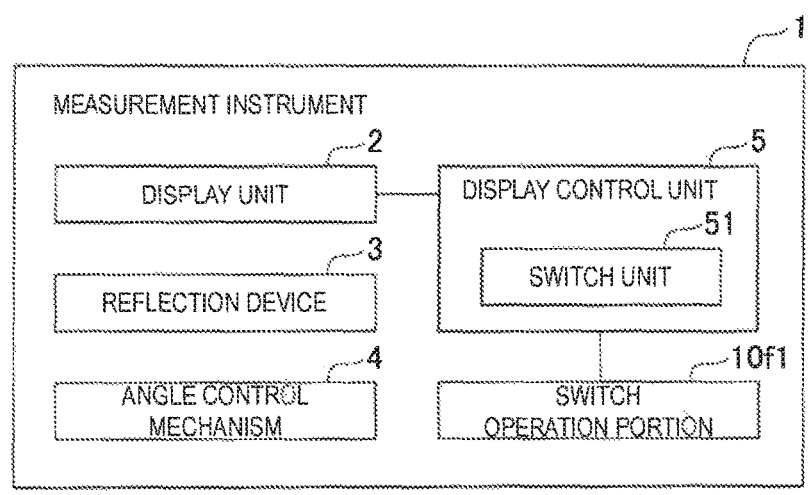
FIG. 5 is a block diagram illustrating the measurement instrument according to the first embodiment.

FIG. 5 is a block diagram illustrating the measurement instrument according to the first embodiment.

As illustrated in FIG. 5, the measurement instrument 1 includes the display unit 2, the reflection device 3, the angle control mechanism 4, the switch operation portion 10f1, and further includes a display control unit 5 configured to control displaying the information on the display unit 2. The display control unit 5 controls displaying the normal display (see FIG. 4A) or the inverted display (see FIG. 4B) as described above on the display unit 2.

The display control unit 5 includes a switch unit 51 configured to switch between the normal display and the inverted display of the information displayed on the display unit 2 when the switch operation portion 10f (see FIG. 1A) is operated. The display control unit 5 is a controller that can include a microcomputer such as an ASIC and has a central processing unit (CPU), ROM, RAM, etc.

When a user operates the switch operation portion 10f1, the switch unit 51 switches from the normal display on the display unit 2 to the inverted display or switches from the inverted display on the display unit 2 to the normal display.

The user rotates the reflection device 3 via the angle control mechanism 4 to control the angle of the reflection device 3, and operates the switch operation portion 10f1 such that the information displayed on the display unit 2 can be seen ordinarily.

According to the present embodiment, the following effects can be achieved.

(1) Since the measurement instrument 1 includes the reflection device 3 configured to invert the information displayed on the display unit 2 via specular reflection, a user can see the information via the reflection device 3 even when the information is difficult to read directly from the display unit 2. Thus, the measurement instrument 1 can improve visibility of the information displayed on the display unit 2.

(2) While light from outside can be blocked by the reflection device 3, the measurement instrument 1 can suppress the amount of light from outside reaching the display surface 21 of the display unit 2. This may prevent the information displayed on the display unit 2 via the display surface 21 from being difficult for a user to see. Thus, the measurement instrument 1 can improve visibility of the information displayed on the display unit 2.

(3) The display control unit 5 is configured to control displaying the inverted display formed by inverting the normal display of the information on the display unit 2. This enables a user to see the information in an ordinary state via the reflection device 3. Thus, a user can see the information in the ordinary state via the reflection device 3.

(4) The display control unit 5 is configured to control displaying on the display unit 2 of the inverted display formed by inverting the normal display of information in line symmetry with respect to the axis of symmetry AX1. This enables a user to see the information in an ordinary state via the reflection device 3.

(5) Since the display control unit 5 includes the switch unit 51 configured to switch between the inverted display and the normal display, it is possible to switch between the inverted display and the normal display of the information displayed on the display unit 2. In other words, when a user directly sees the information displayed on the display unit 2, the user can switch to the normal display, and when a user indirectly sees via the reflection device 3 the information displayed on the display unit 2, the user can switch to the inverted display. Accordingly, a user can select between the normal display and the inverted display, depending on how the user sees the display unit 2.

(6) Since the reflection device 3 includes the angle control mechanism 4 configured to control the angle of the reflection device 3, the angle of the reflection device 3 can be controlled freely. Thus, a user can control the angle of the reflection device 3 via the angle control mechanism 4 to make the information easier to see.

(7) The measurement instrument 1 includes the installation portions 22 for installing the reflection device 3, and the reflection device 3 includes the attachment portions 32 configured to detachably attach to the installation portions 22. This enables the reflection device 3 to be detachably attached to the measurement instrument 1. Thus, the user can select whether to attach the reflection device 3 to the measurement instrument 1.

(8) Since the reflection device 3 reverses the information displayed on the display unit 2 via specular reflection, a user can see the information via the reflection device 3 even when the information is difficult to read directly from the display unit 2. Thus, the reflection device 3 can improve visibility of the information displayed on the display unit 2.

(9) While light from outside can be blocked via the reflection device, the reflection device 3 can suppress the amount of light from outside reaching the display surface 21 of the display unit 2. This may prevent the information displayed on the display unit 2 via the display surface 21 from being difficult for a user to see. Thus, the reflection device 3 can improve visibility of the information displayed on the display unit 2.

Second Embodiment

A second embodiment will be described below with reference to the drawings. Note that hereinafter, components already described are given the same reference signs and description of those components will be omitted.

Figure 6:
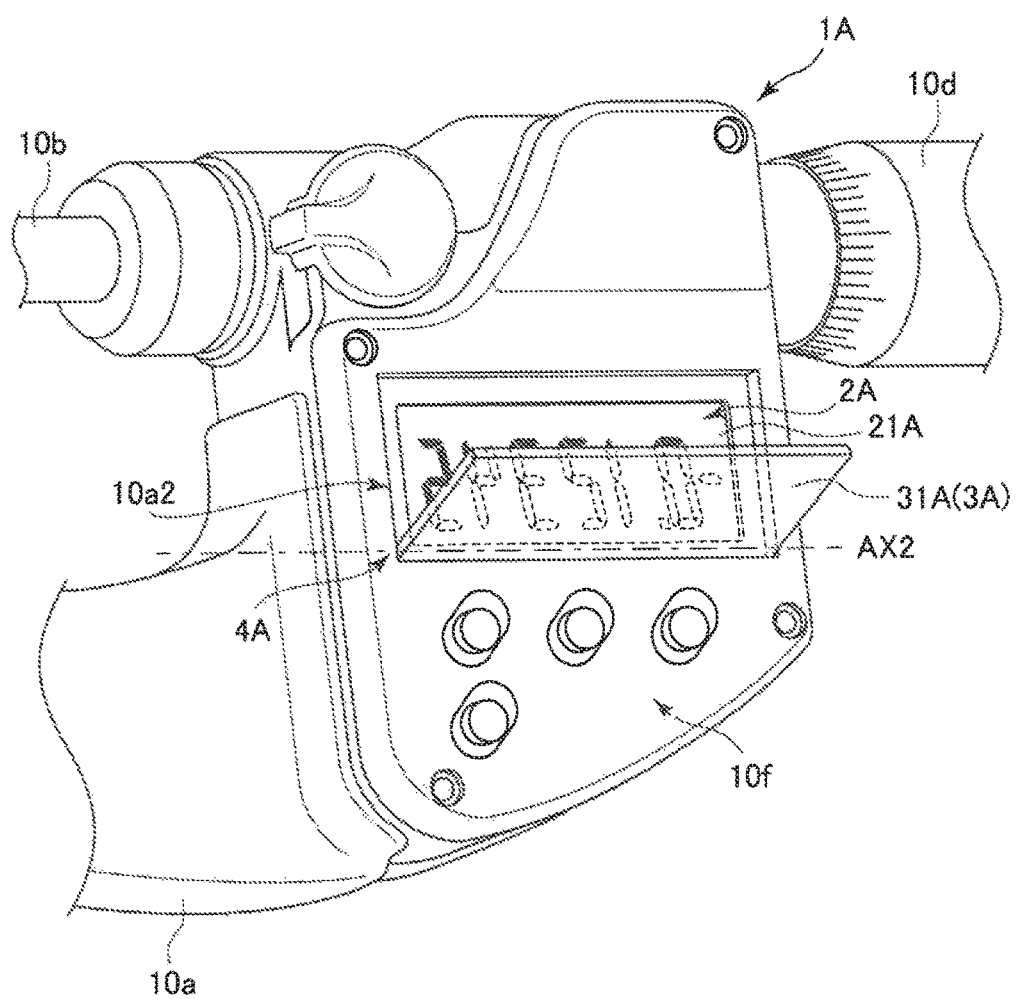
FIG. 6 is a perspective view illustrating a measurement instrument and a reflection device used for the measurement instrument according to a second embodiment.

FIG. 6 is a perspective view illustrating a measurement instrument and a reflection device used for the measurement instrument according to the second embodiment.

A measurement instrument 1A of the present embodiment includes a display unit 2A, a reflection device 3A, and an angle control mechanism 4A, and apart from these, has the same configuration as the measurement instrument 1 of the first embodiment. Note that the measurement instrument 1A of the present embodiment is different from that of the first embodiment in that the measurement instrument 1A does not include the switch operation portion 10f1 of the operation portions 10f.

Additionally, the reflection device 3A of the present embodiment is composed of a semi-reflective mirror and is different from that of the first embodiment in that the reflection device 3A is provided with a reflection surface 31A that reflects a portion of information displayed on the display unit 2A and transmits a portion of the information under certain conditions.

The semi-reflective mirror that composes the reflection surface 31A is a mirror that acts like a mirror with total reflection under certain conditions and acts like glass with partial reflection and partial transmission under certain conditions.

Under certain conditions, for example, when the display unit 2A side is bright and the opposite side of the reflection device 3A to the display unit 2A is dark, the surface on the display unit 2A side acts like a mirror and the surface on the opposite side of the reflection device 3A to the display unit 2A acts like glass with partial reflection and partial transmission. On the other hand, when the display unit 2A side is dark and the opposite side of the reflection device 3A to the display unit 2A is bright, the opposite side to the display unit 2A can be seen through the surface on the display unit 2A side, and the surface on the display unit 2A side has the reduced mirror effects, while the surface on opposite side of the reflection device 3A to the display unit 2A acts like a mirror.

Thus, when the reflection surface 31A is brought into contact with the display unit 2A and a display surface 21A of the display unit 2A is made bright, the information displayed on the display unit 2A can be seen through the reflection device 3A.

The rotation axis of the angle control mechanism 4A of the present embodiment is different from that of the first embodiment in that the rotation axis extends in the lateral direction of a normal display of the information (see FIG. 4A) outward of a display region of the information and is disposed at a position on the lower side of the display region of the information. In other words, the positions of installation portions provided on a window portion 10a2 and attachment portions provided on the reflection device 3A differ from those of the first embodiment. Thus, an axis of symmetry AX2 of the reflection device 3A is different from that of the first embodiment in that the axis of symmetry AX2 extends in the lateral direction of a normal display of the information and is located outside of the display region of the information and is disposed at a position on the lower side of the display region of the information.

Note that the axis of symmetry AX2 is coaxial with the rotation axis of the angle control mechanism 4A about which the reflection device 3A rotates, and hereinafter, the rotation axis of the angle control mechanism 4A may also be referred to as the axis of symmetry AX2.

Figure 7A:
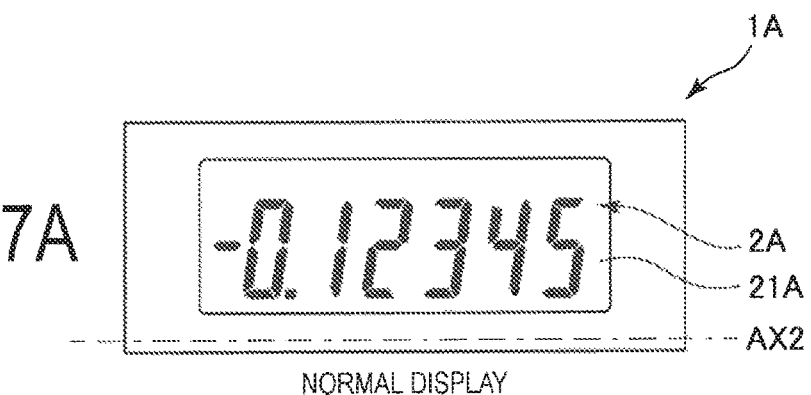
FIGS. 7A and 7B are views illustrating a display unit according to the second embodiment.
Figure 7B:
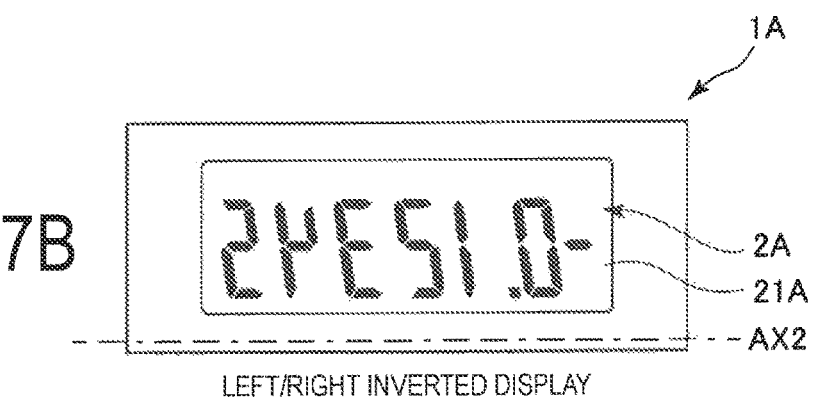

FIGS. 7A and 7B are views illustrating the display unit according to the second embodiment.

Specifically, FIG. 7A illustrates a normal display displayed on the display unit 2A, and FIG. 7B illustrates a left/right inverted display displayed on the display unit 2A.

In the first embodiment, the display unit 2 displays the normal display and the inverted display of the information. The display unit 2A of the present embodiment is different in that the display unit 2A displays the normal display and the left/right inverted display of the information.

As illustrated in FIG. 7A, the normal display displayed on the display unit 2A is in a state which allows a user to see information in an ordinary state.

As illustrated in FIG. 7B, the left/right inverted display displayed on the display unit 2A is a left/right inverted display of the information with respect to the intersection line of the display surface 21A of the display unit 2A and the reflection surface 31A of the reflection device 3A, or in other words, with respect to the axis of symmetry AX2 extending in the lateral direction of the normal display of the information and located outside of the display region of the information, and being disposed at a position on the lower side of the display region of the information.

Here, the information that a user sees via the reflection device 3A is left/right inverted via specular reflection with respect to the axis of symmetry AX2. Thus, when a user looks at the left/right inverted display via the reflection device 3A, the user can see the information in the ordinary state.

Figure 8:
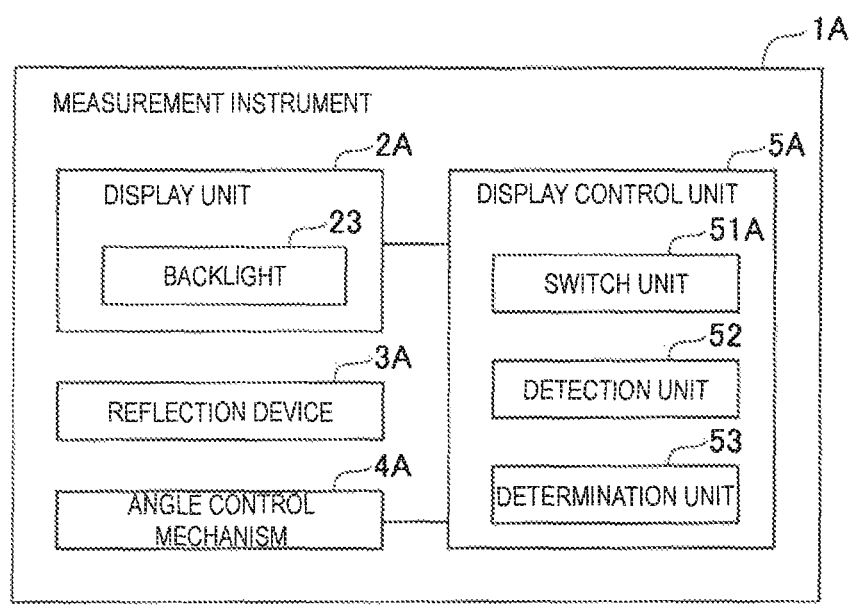
FIG. 8 is a block diagram illustrating the measurement instrument according to the second embodiment.

FIG. 8 is a block diagram illustrating the measurement instrument according to the second embodiment.

In the first embodiment, the display control unit 5 includes the switch unit 51 configured to switch the display of the display unit 2 upon operation by a user. As illustrated in FIG. 8, a display control unit 5A of the present embodiment is different from that of the first embodiment in that the display control unit 5A further includes a detection unit 52 configured to detect an angle controlled by the angle control mechanism 4A, a determination unit 53 configured to determine whether to switch the left/right inverted display and the normal display on the basis of the angle detected by the detection unit 52; and a switch unit 51A is configured to switch the left/right inverted display and the normal display on the basis of the determination by the determination unit 53. The display control unit 5A, like the display control unit 5, is a controller that can include a microcomputer such as an ASIC and has a central processing unit (CPU), ROM, RAM, etc.

Additionally, the display unit 2A of the present embodiment is different from that of the first embodiment in that the display unit 2A further includes a backlight 23.

The backlight 23 is provided inside of the display surface 21A of the display unit 2A. The light emission from inside of the display surface 21A to outside makes the information displayed on the display unit 2A easy to see. Additionally, the backlight 23 is configured to control the amount of light depending on the angle controlled by the angle control mechanism 4A and detected by the detection unit 52.

The detection unit 52 includes an angle sensor and is configured to detect the angle of the reflection device 3A controlled by the angle control mechanism 4A. Note that the sensor provided in the detection unit 52 is not limited to an angle sensor, and the detection unit 52 may include a contact sensor configured to detect contact between the display unit 2A and the reflection device 3A or a sensor configured to detect the strength of the light from outside. In other words, the sensor may be any sensor that can detect conditions used by the determination unit 53 for switching the left/right inverted display and the normal display.

Note that hereinafter, the angle controlled by the angle control mechanism 4A may also be referred to as the angle of the reflection device 3A.

Figure 9:
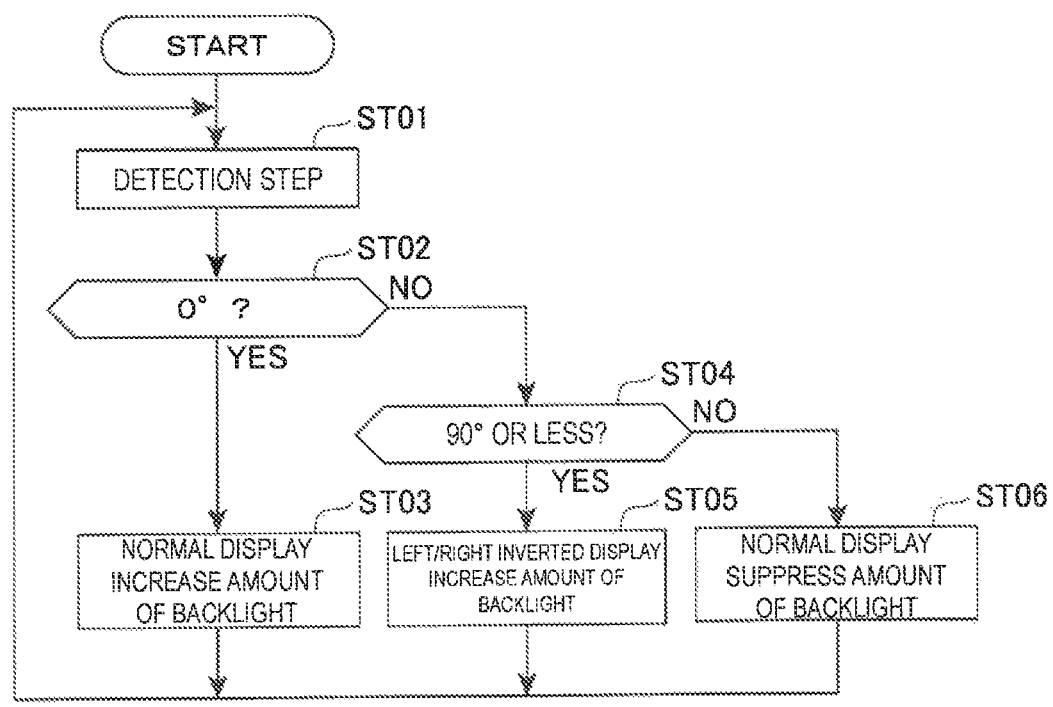
FIG. 9 is a flowchart illustrating a method of switching how the information is displayed on the display unit according to the second embodiment.

FIG. 9 is a flowchart illustrating a method of switching how the information is displayed on the display unit according to the second embodiment.

A method of switching how the information is displayed on the display unit 2A will be described below with reference to FIG. 9.

A user first controls the angle of the reflection device 3A via the angle control mechanism 4A of the measurement instrument 1A. After the angle of the reflection device 3A is controlled via the angle control mechanism 4A, the detection unit 52 of the display control unit 5A executes a detection step of detecting the controlled angle of the reflection device 3A (step ST01).

Subsequently, the determination unit 53 of the display control unit 5A determines whether to switch the left/right inverted display and the normal display on the basis of the angle of the reflection device 3A detected by the detection unit 52, and the switch unit 51A switches between the left/right inverted display and the normal display on the basis of the determination by the determination unit 53 (steps ST02 to ST06).

Specifically, the determination unit 53 determines whether the angle of the reflection device 3A detected by the detection unit 52 is 0°, in other words, whether the display surface 21A of the display unit 2A and the reflection surface 31A of the reflection device 3A are in contact with each other (step ST02).

When the determination unit 53 determines the angle of the reflection device 3A to be 0° (YES at step ST02), the switch unit 51A switches to the normal display of the information displayed on the display unit 2A (step ST03). As a result, the switch unit 51A increases the amount of light of the backlight 23. This is because the display unit 2A side needs to be relatively brighter in order that a user sees the information displayed on the display unit 2A through the reflection device 3A composed of a semi-reflective mirror.

Meanwhile, when the determination unit 53 determines the angle of the reflection device 3A not to be 0° (NO at step ST02), the determination unit 53 subsequently determines whether the angle of the reflection device 3A detected by the detection unit 52 is 90° or less (step ST04).

When the determination unit 53 determines the angle of the reflection device 3A to be 90° or less (YES at step ST04), the switch unit 51A switches to the left/right inverted display of the information displayed on the display unit 2A (step ST05). As a result, the switch unit 51A increases the amount of light of the backlight 23. This is because the display unit 2A side needs to be relatively brighter in order that a user sees the information displayed on the display unit 2A via the reflection device 3A that is a semi-reflective mirror acting like a mirror.

Meanwhile, when the determination unit 53 determines the angle of the reflection device 3A not to be 90° or less (NO at step ST04), the switch unit 51A switches to the normal display of the information displayed on the display unit 2A (step ST06). As a result, the switch unit 51A suppresses the amount of light of the backlight 23. This is for the purpose of reducing energy consumption of the measurement instrument 1A by suppressing the amount of light of the backlight 23, because, when the angle of the reflection device 3A is 90° or greater, the information displayed on the display unit 2A can be seen directly without passing through the reflection device 3A.

Such an embodiment can achieve the same effects as (1) to (3) and (6) to (9) of the first embodiment and can also achieve the following effects.

(10) The display control unit 5A is configured to control displaying on the display unit 2A the left/right inverted display formed by left/right inverting the normal display of information with respect to the axis of symmetry AX2. This enables a user to see the information in an ordinary state via the reflection device 3A.

(11) The display control unit 5A includes the detection unit 52 configured to detect the angle controlled by the angle control mechanism 4A, and the determination unit 53 configured to determine whether to switch the left/right inverted display and the normal display on the basis of the angle detected by the detection unit 52; and the switch unit 51A is configured to switch the left/right inverted display and the normal display on the basis of the determination by the determination unit 53. As a result, the information displayed on the display unit 2A can automatically be switched depending on the angle of the reflection device 3A. Thus, the information displayed on the display unit 2A automatically switches depending on the angle of the reflection device 3A controlled by a user. As a result, the display control unit 5A can improve the usefulness of the measurement instrument 1A.

Modified Embodiments

Note that the present disclosure is not limited to the embodiments described above and includes modifications, variations and the like.

For example, in the embodiments described above, micrometers are used as an example for describing the measurement instruments 1, 1A. However, the measurement instruments may be calipers, height gauges, or dial indicators. In other words, as long as the measurement instrument includes a display unit, the shape and the measurement method of the measurement instrument are not particularly limited. The embodiments may be applied to other types of measurement instruments, and implementation of the embodiments is not particularly limited.

In the first embodiment described above, the reflection surface 31 of the reflection device 3 is composed of a mirror. In the second embodiment described above, the reflection surface 31A of the reflection device 3A is composed of a semi-reflective mirror. However, a prism may be used instead of a mirror or a semi-reflective mirror. In other words, the reflection surface of the reflection device may have any configuration as long as the reflection surface can specularly reflect the information displayed on the display unit to enable the user to see the information.

In the second embodiment, the display unit 2A includes the backlight 23. However, the display unit 2A may not include the backlight 23.

In the embodiments described above, the reflection devices 3, 3A are attached to the measurement instruments 1, 1A via the attachment portions 32 and the installation portions 22. However, the reflection device may be attached at a position away from the measurement instrument by using an arm or a stand without using the attachment portions 32 and the installation portions 22. Additionally, the reflection devices 3, 3A may be integrally formed with the window portion 10a2, and may not include the angle control mechanisms 4, 4A. In other words, the reflection device may be disposed in any manner as long as a user can see the information displayed on the display unit via the reflection device.

In the second embodiment, the determination unit 53 determines whether to switch between the (left/right) inverted display and the normal display on the basis of whether the angle is 90°. However, any other angle than 90° may be used for the determination, depending on how the user sees the display units 2, 2A.

Figure 10:
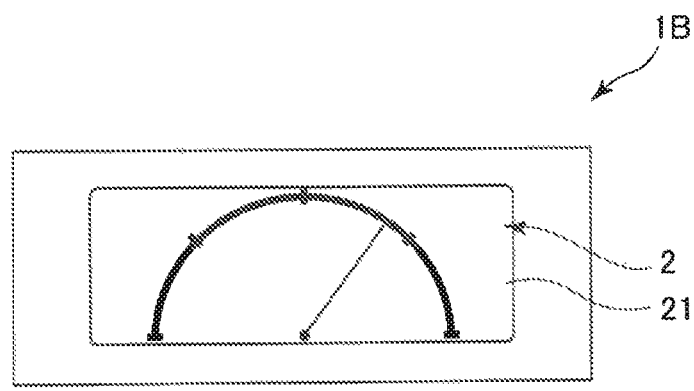
FIG. 10 is a view illustrating a display unit according to a first modified embodiment.

FIG. 10 is a view illustrating a display unit according to a first modified embodiment.

In the embodiments described above, the display units 2, 2A display, for example, the measurement results from the measurement instruments 1, 1A as information, as mainly a seven-segment digital display. However, the information may be displayed in other manners. As illustrated in FIG. 10, for example, the display unit 2 of a measurement instrument 1B may have a display surface 21 that displays the measurement results in a meter display composed of markings and a digitally displayed needle. In other words, the information displayed on the display unit is not particularly limited.

Additionally, in the first embodiment described above, the display control unit 5 controls displaying on the display unit 2 of the information inverted in line symmetry with respect to the axis of symmetry AX1, and in the second embodiment, the display control unit 5A controls displaying on the display unit 2A of the information left/right inverted with respect to the axis of symmetry AX2. Meanwhile, the display control unit may control displaying the information inverted in other manners, and when a user can see the information without the inverted display, the display control unit may control displaying the information without the inverted display.

Figure 11:
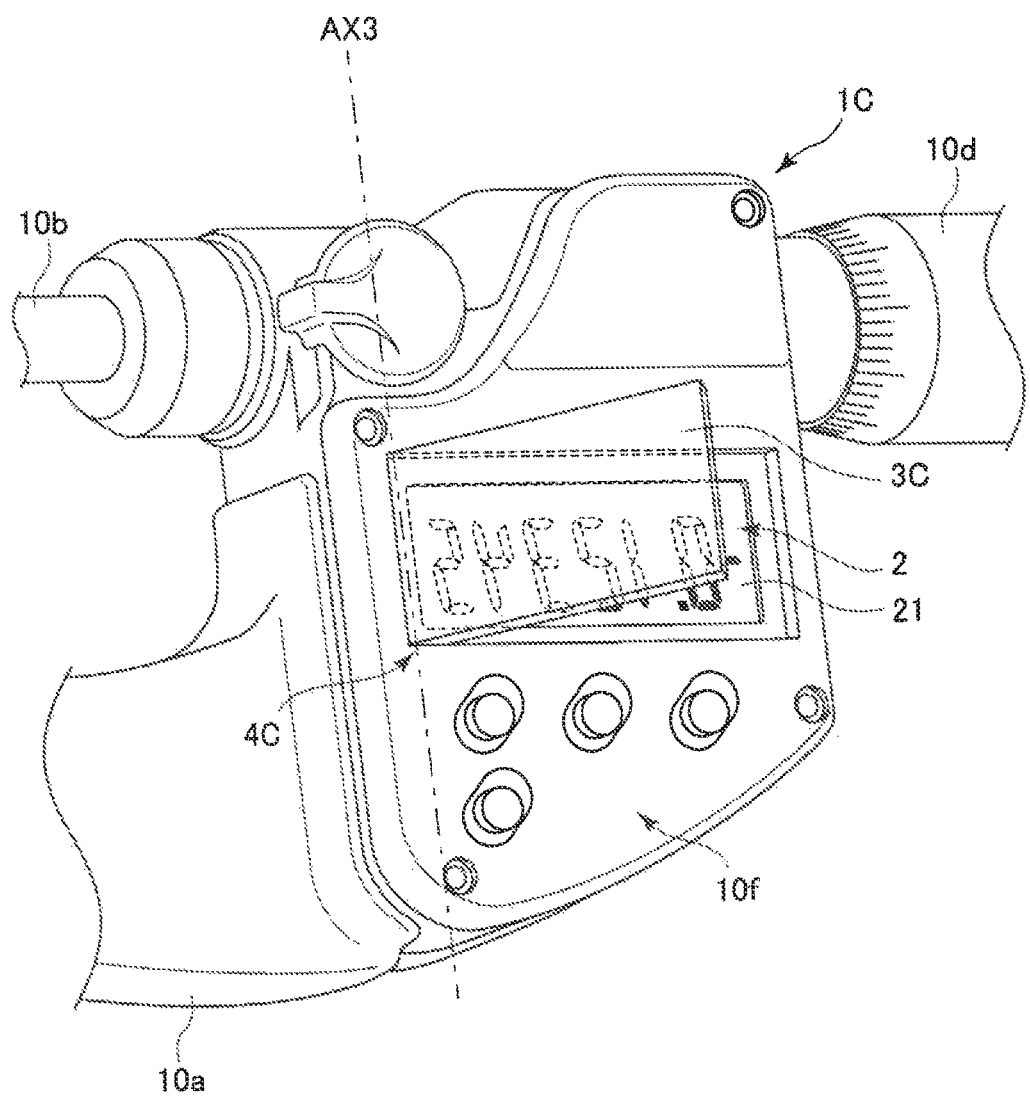
FIG. 11 is a perspective view illustrating a measurement instrument and a reflection device used for the measurement instrument according to a second modified embodiment.
Figure 12:
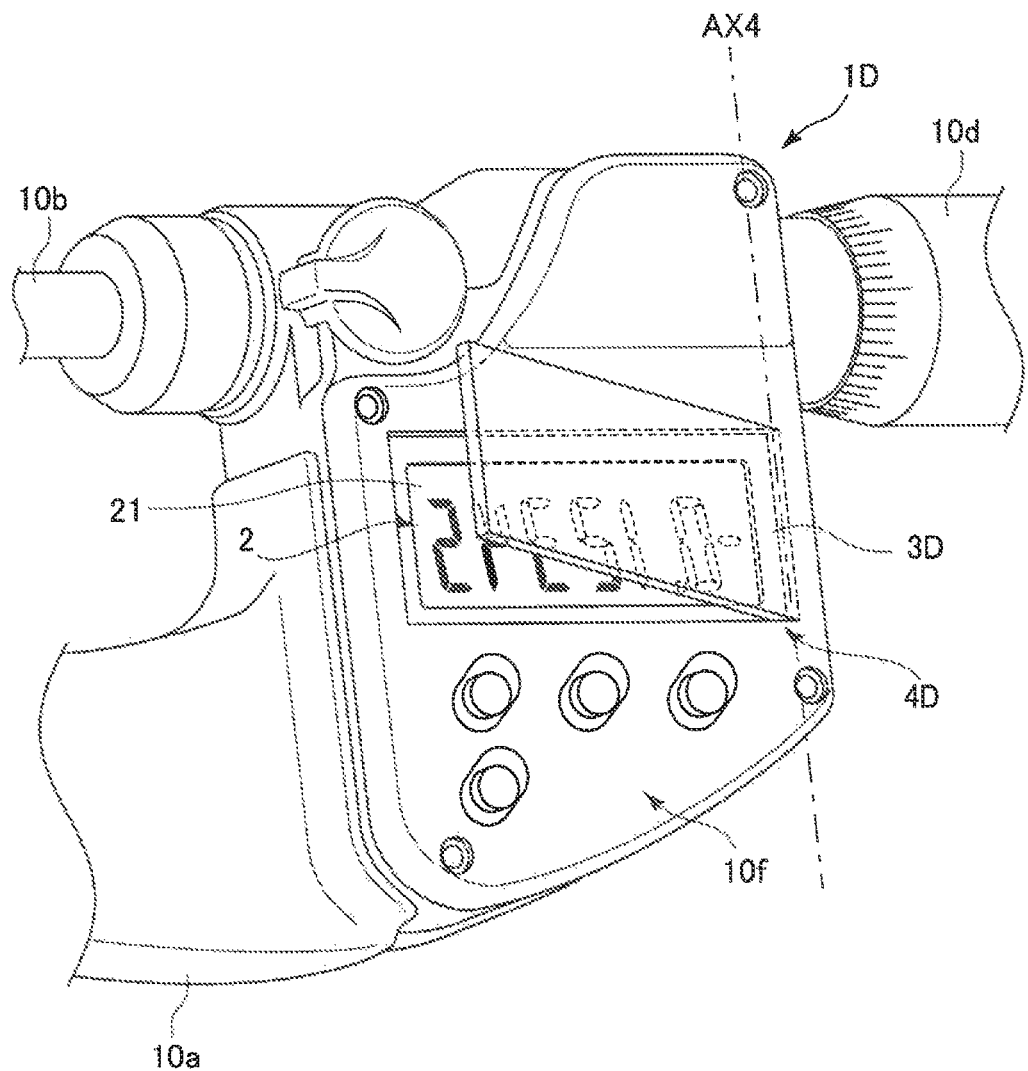
FIG. 12 is a perspective view illustrating a measurement instrument and a reflection device used for the measurement instrument according to a third modified embodiment.

FIG. 11 is a perspective view illustrating a measurement instrument and a reflection device used for the measurement instrument according to a second modified embodiment. FIG. 12 is a perspective view illustrating a measurement instrument and a reflection device used for the measurement instrument according to a third modified embodiment.

In the first embodiment described above, the reflection device 3 includes the axis of symmetry AX1 that extends in the lateral direction of the normal display of the information at a location outside of the display region of the information and that is disposed on the upper side of the display region of the information. In the second embodiment, the reflection device 3A includes the axis of symmetry AX2 that extends in the lateral direction of the normal display of the information at a location outside of the display region of the information and that is disposed on the lower side of the display region of the information.

As illustrated in FIG. 11, in a measurement instrument 1C according to the second modified embodiment, an axis of symmetry AX3 that is the rotation axis of an angle control mechanism 4C provided on a reflection device 3C may extend in a vertical direction of a normal display of information on the display unit 2 at a location outside of a display region of the information and may be disposed on the left side (left side of the paper) of the display region of the information.

Additionally, as illustrated in FIG. 12, in a measurement instrument 1D according to the third modified embodiment, an axis of symmetry AX4 that is the rotation axis of an angle control mechanism 4D provided on a reflection device 3D may extend in a vertical direction of a normal display of information on the display unit 2 at a location outside of a display region of the information and may be disposed on the right side (right side of the paper) of the display region of the information.

Here, the information that a user sees via the reflection devices 3C, 3D is inverted in line symmetry via specular reflection with respect to the axes of symmetry AX3, AX4. Thus, when a user looks at an inverted display via the reflection devices 3C, 3D, the user can see the information in an ordinary state.

As described above, embodiments can be suitably applied to a measurement instrument including a display unit configured to display information, and applied to a reflection device used for the measurement instrument.

What is claimed is:

1. A measurement instrument comprising:
a display configured to display information;
a display controller configured to control displaying of the information on the display; and
a reflector configured to invert the information displayed on the display via specular reflection, the reflector including a semi-reflective mirror and the reflector being movable between a first position at which the reflector covers the display and a second position at which the reflector is disposed at an angle relative to the display, wherein
the display controller causes display of (i) a normal display image of the information on the display when the reflector is at the first position covering the display, and (ii) an inverted display image formed by inverting the normal display image when the reflector is at the second position at the angle relative to the display.

2. The measurement instrument according to claim 1, wherein the display controller is configured to control displaying on the display of an inverted display image formed by inverting a normal display image of the information.

3. The measurement instrument according to claim 1, wherein the display controller is configured to control displaying on the display of an inverted display image formed by inverting a normal display image of the information in line symmetry with respect to an axis of symmetry that is an intersection line of a display surface of the display and a reflection surface of the reflector, and the axis of symmetry extends in a lateral direction of the normal display image of the information at a location outside of a display region of the information and is disposed at a position other than on a lower side of the display region of the information.

4. The measurement instrument according to claim 1, wherein the display controller is configured to control displaying on the display of a left/right inverted display image formed by left/right inverting a normal display image of the information with respect to an axis of symmetry that is an intersection line of a display surface of the display and a reflection surface of the reflector, and the axis of symmetry extends in a lateral direction or in a vertical direction of the normal display image of the information at a location outside of a display region of the information and is disposed at a position on a lower side of the display region of the information.

5. The measurement instrument according to claim 2, wherein the display controller is configured to switch between displaying the inverted display image and the normal display image on the display.

6. The measurement instrument according to claim 3, wherein the display controller is configured to switch between displaying the inverted display image and the normal display image on the display.

7. The measurement instrument according to claim 4, wherein the display controller is configured to switch between displaying the left/right inverted display image and the normal display image on the display.

8. The measurement instrument according to claim 5, wherein:
the reflector is pivotally attached to the display so that an angle between a display surface of the display and a reflection surface of the reflector is adjustable;
the measurement instrument further comprises an angle detector configured to detect the angle between the display surface and the reflection surface; and
the display controller is configured to switch to the inverted display image or to the normal display image based on the angle detected by the angle detector.

9. The measurement instrument according to claim 6, wherein:
the reflector is pivotally attached to the display so that an angle between a display surface of the display and a reflection surface of the reflector is adjustable;
the measurement instrument further comprises an angle detector configured to detect the angle between the display surface and the reflection surface; and
the display controller is configured to switch to the inverted display image or to the normal display image based on the angle detected by the angle detector.

10. The measurement instrument according to claim 7, wherein:
the reflector is pivotally attached to the display so that an angle between a display surface of the display and a reflection surface of the reflector is adjustable;

the measurement instrument further comprises an angle detector configured to detect the angle between the display surface and the reflection surface; and the display controller is configured to switch to the left/right inverted display image or to the normal display image based on the angle detected by the angle detector.

11. The measurement instrument according to claim 1, wherein the reflector and a housing of the measurement instrument include cooperating connectors by which the reflector is detachably attached to the housing of the measurement instrument.

12. The measurement instrument according to claim 2, wherein the reflector and a housing of the measurement instrument include cooperating connectors by which the reflector is detachably attached to the housing of the measurement instrument.

13. The measurement instrument according to claim 3, wherein the reflector and a housing of the measurement instrument include cooperating connectors by which the reflector is detachably attached to the housing of the measurement instrument.

14. The measurement instrument according to claim 4, wherein the reflector and a housing of the measurement instrument include cooperating connectors by which the reflector is detachably attached to the housing of the measurement instrument.

15. The measurement instrument according to claim 5, wherein the reflector and a housing of the measurement instrument include cooperating connectors by which the reflector is detachably attached to the housing of the measurement instrument.

16. The measurement instrument of claim 1, further comprising:

a user-operable switch, wherein the display controller switches between displaying, on the display, based on user operation of the user-operable switch, (i) a normal display image and (ii) an inverted display image, the inverted display image being formed by inverting the normal display image.

17. The measurement instrument according to claim 1, wherein the display controller increases a brightness of the display when the reflector is at the first position compared to when the reflector is at the second position.

18. The measurement instrument according to claim 1, further comprising:

measuring members that measure a distance, wherein the display is configured to display measurement information based on the distance measured by the measuring members, the display controller is configured to control displaying of the measurement information on the display, and the reflector is configured to invert the measurement information displayed on the display via specular reflection.

* * * * *